(12) United States Patent
Ress et al.

(10) Patent No.: US 9,204,181 B2
(45) Date of Patent: Dec. 1, 2015

(54) CONTENT OVERLAYS IN ON-DEMAND STREAMING APPLICATIONS

(75) Inventors: David P. Ress, Cary, NC (US); Dominic Goodwill, Kanata (CA)

(73) Assignee: GENBAND US LLC, Plano, TX (US)

( * ) Notice: Subject to any disclaimer, the term of this patent is extended or adjusted under 35 U.S.C. 154(b) by 1394 days.

(21) Appl. No.: 12/333,678

(22) Filed: Dec. 12, 2008

(65) Prior Publication Data

US 2010/0153990 A1 Jun. 17, 2010

(51) Int. Cl.
| | |
|---|---|
| *H04N 21/81* | (2011.01) |
| *H04N 21/431* | (2011.01) |
| *H04N 21/478* | (2011.01) |
| *H04N 21/258* | (2011.01) |
| *G06Q 30/02* | (2012.01) |
| *H04N 7/16* | (2011.01) |
| *H04N 21/44* | (2011.01) |
| *H04N 21/45* | (2011.01) |
| *H04N 21/858* | (2011.01) |

(52) U.S. Cl.
CPC ......... *H04N 21/25891* (2013.01); *G06Q 30/02* (2013.01); *G06Q 30/0251* (2013.01); *H04N 7/163* (2013.01); *H04N 21/4316* (2013.01); *H04N 21/44016* (2013.01); *H04N 21/4524* (2013.01); *H04N 21/47815* (2013.01); *H04N 21/812* (2013.01); *H04N 21/8583* (2013.01); *H04N 21/478* (2013.01)

(58) Field of Classification Search
CPC ... H04N 21/812; H04N 21/478; H04N 21/4316
USPC .......... 725/37–43, 50, 51, 60, 61, 32, 34–36, 725/46
See application file for complete search history.

(56) References Cited

U.S. PATENT DOCUMENTS

| | | | | |
|---|---|---|---|---|
| 2002/0144262 | A1* | 10/2002 | Plotnick et al. | 725/32 |
| 2009/0094637 | A1* | 4/2009 | Lemmons | 725/32 |
| 2009/0172746 | A1* | 7/2009 | Aldrey et al. | 725/61 |
| 2009/0254824 | A1* | 10/2009 | Singh | 715/716 |
| 2009/0320073 | A1* | 12/2009 | Reisman | 725/51 |

* cited by examiner

*Primary Examiner* — Benjamin R Bruckart
*Assistant Examiner* — Jason Thomas
(74) *Attorney, Agent, or Firm* — Jenkins, Wilson, Taylor & Hunt, P.A.

(57) ABSTRACT

A personalized content overlay is generated and sent for display to a subscriber. The content overlay may be generated in response to a request by the subscriber, such as a request to watch a program. The content overlay can include personalized information tailored to the subscriber based on subscriber information. The content overlay can also include information obtained from a third party, such as an advertiser, that has a preexisting relationship with the subscriber. The content overlay can include one or more triggers that, when activated by the subscriber, enable interactivity between the subscriber and a third party.

18 Claims, 11 Drawing Sheets

CONTENT OVERLAYS IN ON-DEMAND STREAMING APPLICATIONS

FIELD OF THE INVENTION

The present invention relates to content overlays, and in particular to generating a personalized content overlay in an on-demand streaming application.

BACKGROUND OF THE INVENTION

Typically, a content overlay, such as a weather emergency notification, is indiscriminately provided by a service provider to a large number of subscribers, or is at most limited by some attribute that applies to a large population of the subscriber base, such as geography. Such widespread and uniform content may be appropriate for certain types of content overlays, such as a weather emergency overlay; however, a personalized content overlay will generally be more effective than a non-personalized content overlay in many scenarios. Considering again the example of a weather emergency overlay, few would argue that an overlay appearing on a television screen stating "John Doe, it has been determined that your house is in the path of a severe storm" would be more effective than an overlay stating "The National Weather Service has issued a weather advisory for a three county region."

Many advertisers recognize that advertisements targeted for particular populations are more effective within those targeted populations than non-targeted advertisements. For example, a national pizza chain advertisement might be more effective if the advertisement includes a reference to a local pizza outlet where the advertised pizza may be purchased. However, the production cost of video advertisements, such as a television commercial, may preclude the production and distribution of a number of different advertisements, each targeted for a different locality. In some instances, an advertiser may allow a regional or local entity, such as a car dealership, to modify the commercial to include local identification information. However, these modifications may incur substantial costs and must be done prior to providing the advertisement to the local service provider, thereby limiting the extent to which the advertisement can be targeted. For example, even in an average-sized city, a consumer may reside closer to one car dealership than another, and a commercial from a car dealership on the other side of town may not be as effective as a commercial from a car dealership across the street.

One mechanism for targeted advertising involves embedding interactive content, or triggers, into a commercial. When the commercial is played in conjunction with the appropriate equipment, a viewer can select or otherwise activate the trigger, which may then cause a web site containing more personalized information to appear on the television, or may enable the viewer to enter specific information that can be used to provide a more targeted advertising experience. However, such commercials are produced to work on particular equipment, and therefore when played on other equipment may not be operable, or the particular service provider providing the commercial may not have a contract or the means to provide the interactivity, resulting in viewer confusion and dissatisfaction. Moreover, such interactive commercials can only target a particular viewer after the viewer has selected the trigger, and therefore may be insufficient to capture the viewer's interest in the first place. Thus, there is a need to economically modify content, such as an advertisement, so that the content is personalized for a particular subscriber.

SUMMARY OF THE INVENTION

The present invention generates personalized content overlays for delivery to a particular subscriber. According to one embodiment of the present invention, upon a request for a program from a subscriber, a personalized content overlay is generated and displayed to the subscriber. The personalized content overlay can include information obtained as a function of subscriber specific data, such as a subscriber profile, including address information, or subscriber preference information. The personalized content overlay can also include personalized offers, such as a coupon based on previous orders placed by the subscriber, can include interactive features that are personalized for the subscriber, can permit the subscriber to initiate a phone call with an advertiser, or can provide highly relevant content to the subscriber based on subscriber profile information.

According to one embodiment of the present invention, an advertisement slot is sold by a service provider to an advertiser. The advertiser also purchases a content overlay including, for example, an interactive click-to-call overlay with a trigger operable to initiate a call between a subscriber and the advertiser. An advertising definition is created that associates the content overlay with the advertisement and defines overlay parameters of the purchased content overlay. The advertisement is scheduled to play according to an advertising schedule. A request to play a program is received from a subscriber. The advertising schedule indicates that the advertisement should be played prior to playing the program. The advertising definition is obtained and the content overlay is generated based on the overlay parameters in the advertising definition and information associated with the subscriber. The content overlay is embedded in a stream of data carrying the advertisement to a user device of the subscriber. The user device then displays the advertisement and the content overlay. The subscriber observes the content overlay and selects the interactive click-to-call overlay trigger. A call server initiates a phone call between the subscriber and the advertiser.

According to another embodiment of the present invention, the personalized content overlay is associated with a program containing a product placement by an advertiser. The personalized content overlay is presented to the subscriber at the time the product placement is shown during the course of the program. The personalized content overlay includes a trigger that, when selected, provides an opportunity for the subscriber to order the product or discuss the product with a representative of the advertiser, for example.

According to yet another embodiment of the present invention, the advertisement and the content overlay are sent separately to the user device, such as a set top box. The set top box combines the advertisement and the content overlay into a signal and presents the signal to a display device, such as a television. The subscriber selects the interactive click-to-call overlay trigger and the call server initiates a phone call between the subscriber and the advertiser.

The content overlay may include information obtained from the advertiser. For example, the subscriber profile information may indicate that the subscriber is a customer of the advertiser and may include a customer identification number that identifies the subscriber to the advertiser. The advertiser's server or other information resource may be contacted and provided the customer identification number. The advertiser's server can then use the customer identification number to obtain information about the subscriber, such as the subscriber's previous order from the advertiser, and generate a coupon containing a special price for the same order. The coupon may be included in the content overlay along with a trigger that is operable to place the same order with a local franchise of the advertiser upon activation of the trigger.

The personalized content overlay of the present invention can include, but is not limited to, personalized click-to-call triggers, personalized coupons, and personalized notifications based on subscriber profile information. Since the personalized content overlay is generated in response to a request by a particular subscriber, the content overlay is personalized to the particular subscriber, thereby increasing the effectiveness of the personalized content overlay.

The present invention enables a service provider to combine a highly personalized content overlay with prerecorded material with little or no additional production costs. The present invention also enables a subscriber to purchase goods or services that are likely to be of interest to the subscriber with minimum effort.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to personalized content overlays that can be generated and merged with related video content. The personalized content overlays can be generated and merged with the video content immediately prior to viewing the video content, enabling generation of a personalized content overlay that is highly relevant to a particular subscriber. The present invention will be described herein in the context of advertising content overlays overlayed upon a prerecorded advertisement, or overlayed upon a program featuring a product placement. However, the present invention has applicability far beyond advertising, and can be used in any context where associating a personalized content overlay with prerecorded material is desirable.

The personalized content overlays of the present invention preferably, but not necessarily, contain interactive features that enable a subscriber to activate triggers that result in actions related to the particular subscriber. For example, a personalized content overlay can include a click-to-call overlay containing a trigger which, when activated by the subscriber, automatically establishes a call between a telephone associated with the subscriber and the nearest franchise location of the advertiser. As used herein, the term 'trigger' refers to any feature in the personalized content overlay that a subscriber may select, or activate, to cause an additional action to occur. In the context of a television viewer, triggers are typically activated by performing an operation on an associated remote control device. The personalized content overlay may inform the television viewer precisely how to activate the trigger. For example, a personalized content overlay may indicate to "Press '#' to initiate a call with your nearest Pizza Queen Restaurant."

Figure 1:
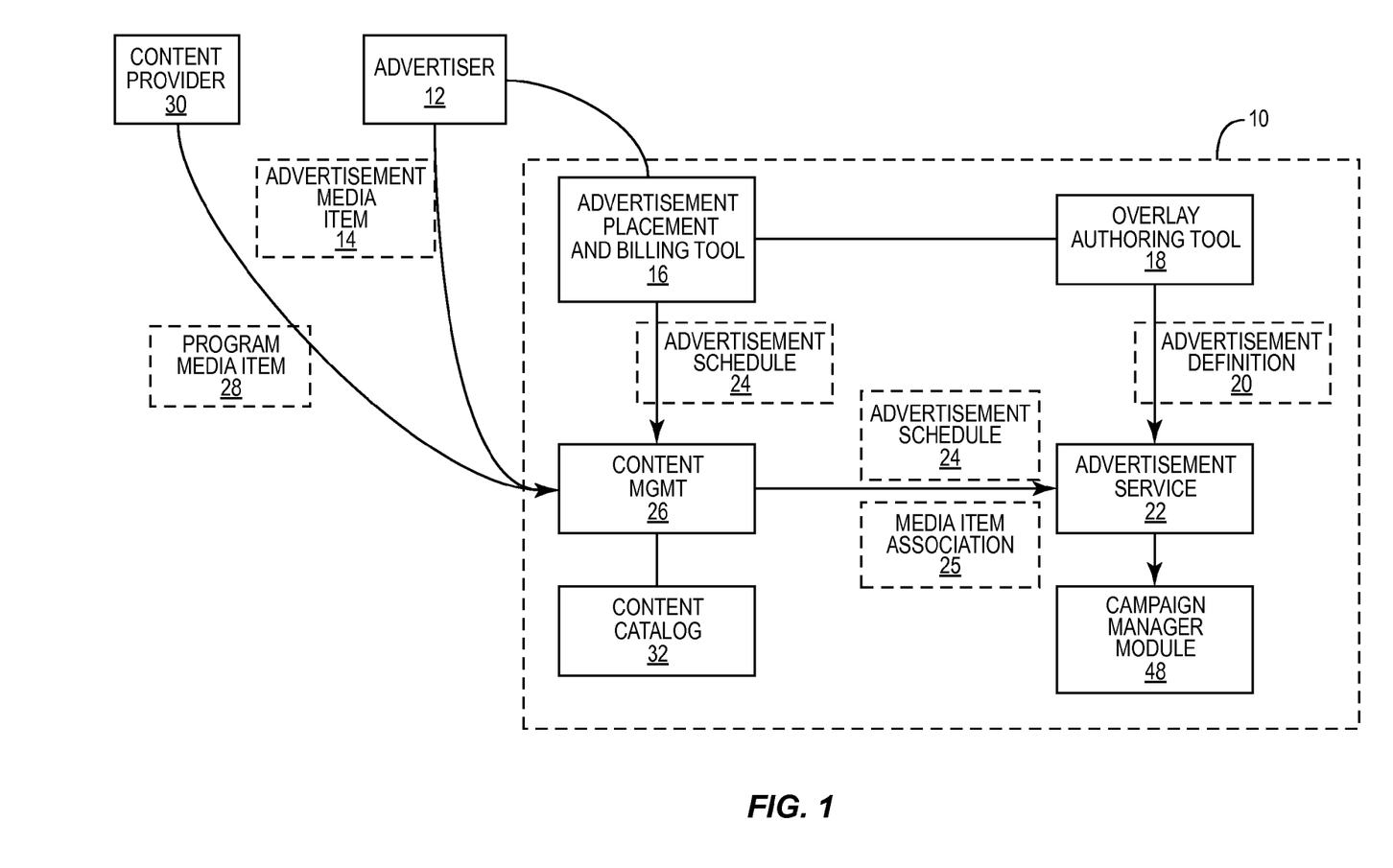
FIG. 1 is a block diagram illustrating entities and modules suitable for generating an overlay definition according to one embodiment of the present invention.

FIG. 1 is a block diagram illustrating entities and modules for generating an overlay definition according to one embodiment of the present invention. While the invention is described primarily in the context of a personalized content overlay in conjunction with an advertisement, the content overlays of the present invention may be used with any suitable media content, including on demand programs, such as movies or sporting events. A video service provider 10 typically offers an advertiser 12 a right to purchase an advertising slot during which the service provider 10 will display an advertisement media item 14 to a subscriber. The video service provider 10 typically uses an advertisement placement tool 16 to facilitate coordination of multiple advertising slots and an advertising schedule for a potentially large number of advertisers 12 and associated advertisement media items 14. The advertisement placement tool 16 can also include billing functionality to manage payment for placement of the advertisement media item 14 in an advertising slot.

According to one embodiment of the present invention, the video service provider 10 can offer the advertiser 12 the ability to purchase and associate one or more personalized content overlays with the advertisement media item 14 that can be personalized for a particular subscriber viewing the advertisement media item 14. By content overlay, it is meant that content in addition to the preexisting content of the advertisement media item 14 is displayed to a subscriber when the subscriber is viewing the advertisement media item 14. By personalized, it is meant that the content overlay is at least in part derived from information associated with the subscriber that is associated with a user device to which the advertisement media item 14 and personalized content overlay are sent. The information associated with the subscriber may be included in the content that is displayed to the subscriber, or may be otherwise used to provide a personalized experience for the subscriber, such as, for example, arranging a telephone call between the subscriber and the advertiser, or to display directions from the residence of the subscriber to the nearest franchise location of the advertiser.

Assuming the advertiser 12 chooses to purchase a personalized content overlay, an overlay authoring tool 18 can be used to define parameters associated with the personalized content overlay. The personalized content overlay parameters may include a type of personalized content overlay, for example a click-to-call overlay, a coupon overlay, or a map overlay. The types of overlays that are discussed herein are merely exemplary, and can comprise any type of content that may be desirable to show to a subscriber in conjunction with the advertisement media item 14. Although reference will be made herein to a click-to-call overlay for purposes of illustration, the invention is not limited to any particular type of overlay.

According to one embodiment of the present invention, the personalized content overlay parameters may comprise a "video" field, which identifies a pointer such as a Uniform Resource Identifier (URI) or other link to the advertisement media item 14, and a click-to-call (C2C) field, which identifies whether or not a click-to-call personalized content overlay has been purchased. If a click-to-call personalized content overlay has been purchased, the personalized content parameters can include a "destination" field, which identifies a destination telephone number that may be called if the subscriber activates the trigger associated with the personalized content overlay. Alternately, the destination telephone number may be determined when the personalized click-to-call personalized content overlay is generated. Personalized content parameters can also include a "coupon" field indicating whether or not a personalized coupon overlay has been purchased and, if so, personalized content parameters can include an "application programming interface (API)" field identifying an API definition that can be used to obtain a coupon from the advertiser 12, or the personalized content overlay parameters may comprise a URI or a pointer to a Web Service Definition Language (WSDL) document describing a particular interface. The personalized content overlay parameters can also include a "map" field identifying whether a personalized map overlay has been purchased and, if so, the personalized content overlay parameters can also include an "API" field similar to that designated for the personalized coupon overlay, which can be used to obtain a personalized map from the advertiser 12.

The personalized content overlay parameters are stored in an advertisement definition 20, which includes a link or other reference to the advertisement media item 14 and the personalized content overlay parameters. The advertisement definition 20 can be provided to an advertisement service 22, which may be used to assemble the personalized content overlay from the personalized content overlay parameters at the appropriate time, as described in greater detail below.

The overlay authoring tool 18 can also provide costs associated with the personalized content overlay to the advertisement placement tool 16. The advertisement placement tool 16 can provide an advertisement schedule 24 to a content management module 26, which coordinates the receipt and storage of content, such as the advertisement media item 14 from the advertiser 12, and one or more program media items 28 from one or more content providers 30. The content management module 26 can also provide information regarding the program media items 28 to a content catalog 32 for use by a subscriber in selecting and requesting a program. The content management module 26 provides the advertisement schedule 24 and a media item association 25 to the advertisement service 22. A campaign manager module 48 retains the advertisement schedule 24 and the advertisement definitions 20 for use by the advertisement service 22 during the provision of advertisements and content overlays for subscribers, as described in greater detail in FIG. 3. The campaign manager module 48 helps implement an advertising "campaign" for each of the advertisers 12 that wish to provide advertisements via the video service provider 10.

Although for purposes of illustration the personalized content overlay has been described as being associated with the advertisement media item 14, the present invention is not limited thereto. For example, assume that the program media item 28 includes a scene where people meet in a room and eat a pizza, and the identity of the pizza franchise is prominently displayed on the pizza box during the scene. The personalized content overlay may be displayed to the subscriber during this scene, inviting the subscriber to activate a trigger that establishes a telephone call between the subscriber and a local franchise location of the pizza restaurant portrayed in the scene.

Figure 2:
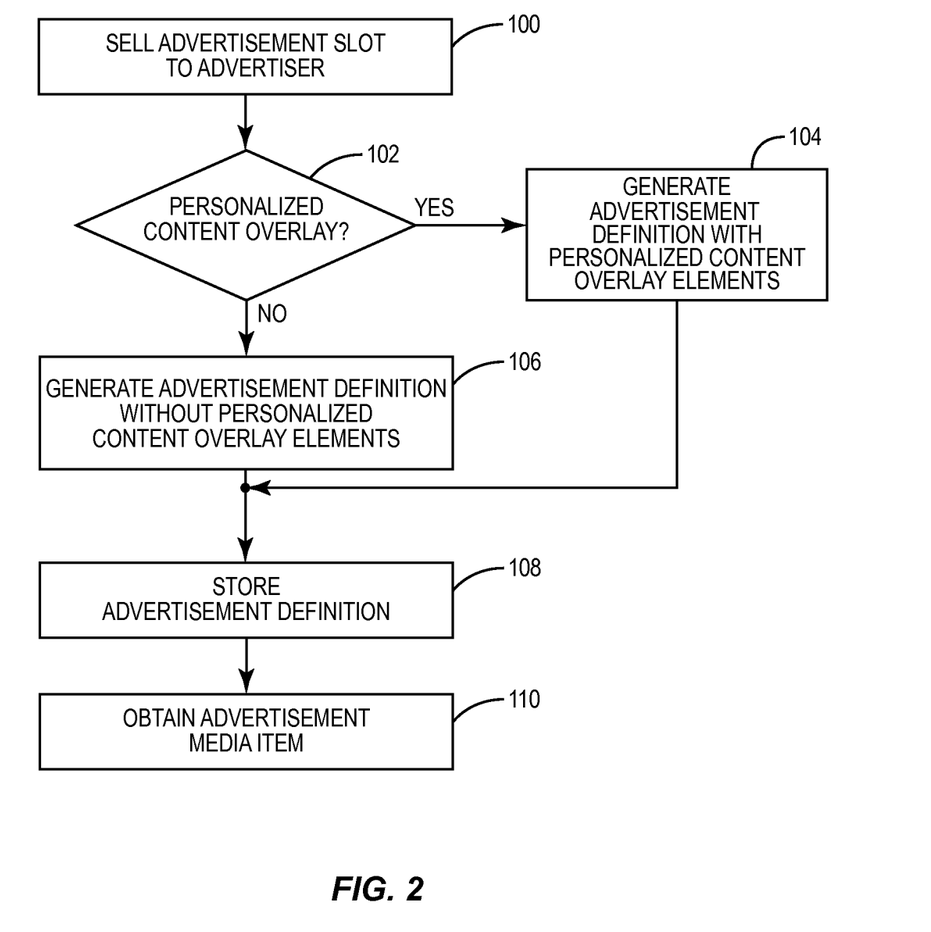
FIG. 2 is a flow chart illustrating a process for associating an overlay definition with a media item according to one embodiment of the present invention.

FIG. 2 is a flow chart illustrating a process for associating an overlay definition with a media item according to one embodiment of the present invention. The video service provider 10 sells an advertising slot to an advertiser 12 (step 100). The video service provider 10 offers the advertiser 12 the opportunity to purchase one or more personalized content overlays that will be displayed in conjunction with the advertisement media item 14 provided by the advertiser 12 (step 102). If the advertiser 12 decides to purchase a personalized content overlay, then an advertisement definition 20 containing personalized content overlay elements, or personalized content overlay parameters, is generated (step 104). If the advertiser 12 chooses not to purchase a personalized content overlay, then an advertisement definition 20 is generated without personalized content overlay elements (step 106). The advertisement definition 20 is then saved on a storage device (step 108). The video service provider 10 then obtains the advertisement media item 14 from the advertiser 12 (step 110).

Figure 3:
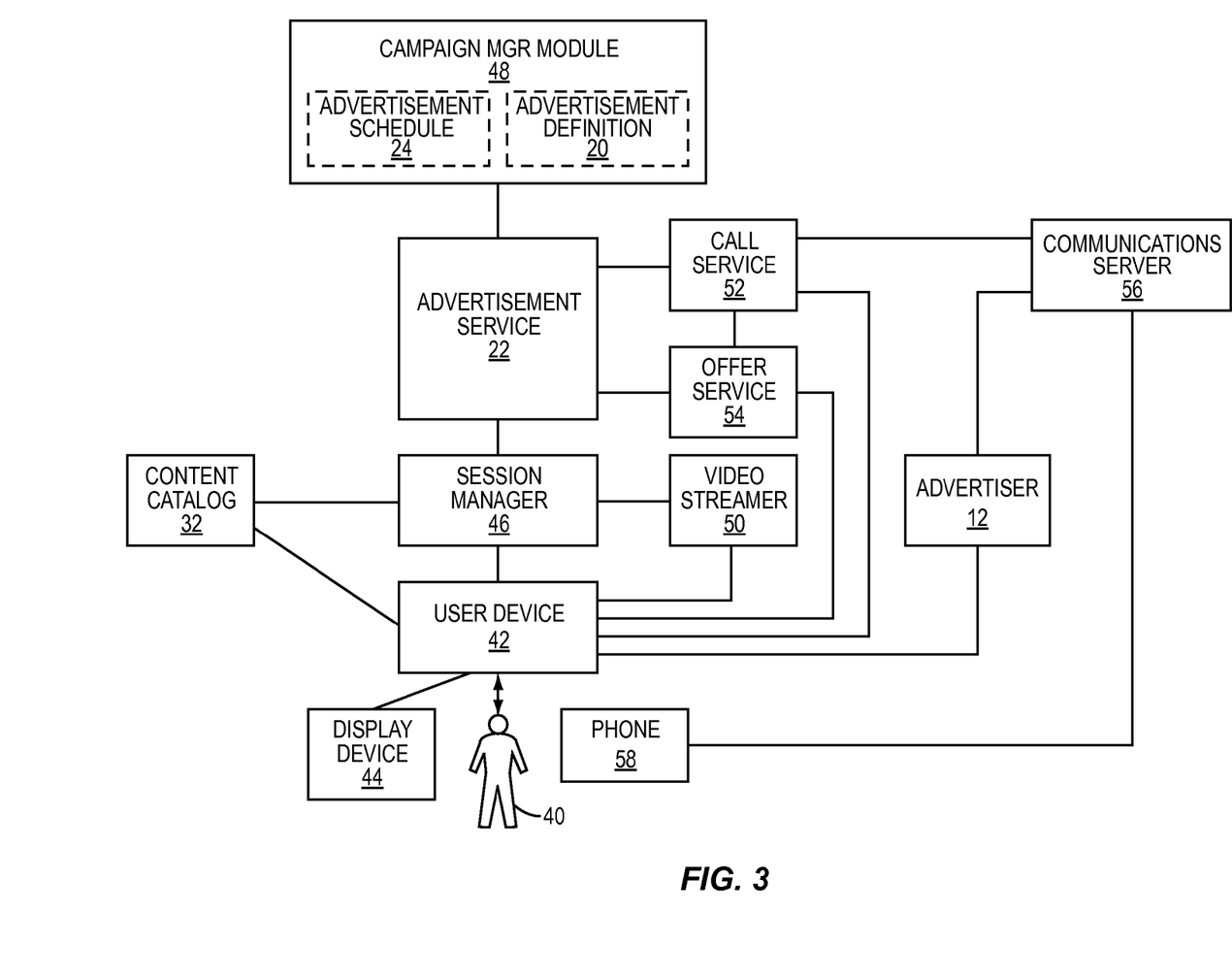
FIG. 3 is a block diagram illustrating modules suitable for generating a personalized content overlay according to one embodiment of the present invention.

FIG. 3 is a block diagram illustrating modules for generating a personalized content overlay according to one embodiment of the present invention. A subscriber 40, sometimes referred to herein as a user or viewer, interacts with a user device 42 to obtain a program catalog from the content catalog 32. The user device 42 displays the program catalog on a display device 44 of the subscriber 40. The user device 42 can comprise any suitable processing device capable of implementing the functionality described herein. According to one embodiment of the present invention, the user device 42 is a set top box, and the display device 44 is a television. According to another embodiment of the present invention, the user device 42 is a computer, and the display device 44 is a computer display, such as a liquid crystal display (LCD) monitor. The user device 42 can implement the appropriate functionality through software, hardware, or a combination of software and hardware. The user device 42 can communicate with the content catalog 32 and the other modules described herein through a conventional communications infrastructure, such as via cable, digital subscriber line (DSL), satellite, or other wireless communications technologies, and can use conventional or proprietary messaging protocols. The subscriber 40 interacts with the user device 42 with an input device (not shown) suitable for the particular user device 42. For example, when the user device 42 is a set top box, the subscriber 40 may use a remote control to interact with the user device 42. Where the user device 42 is a general purpose computer, the subscriber 40 may use a keyboard or mouse to interact with the user device 42.

The subscriber 40 can select a particular program from the program catalog, and the user device 42 identifies the selected program to a session manager 46. The selection of the program may be an on-demand program selection by the subscriber 40. The session manager 46 informs the advertisement service 22 of the request to play the program. The advertisement service 22 interfaces with the campaign manager module 48 that includes the advertisement schedule 24 and the advertisement definition 20. The campaign manager module 48 determines that, according to the advertisement schedule 24, the advertisement media item 14 should be sent to the subscriber 40 prior to providing the selected program. The advertisement definition 20 associated with the respective advertising campaign is then sent to the session manager 46. The session manager 46 updates a playlist to include the selected program and the advertisement media item 14, and sends the playlist to a video streamer 50. The video streamer 50 can begin transmission of the advertisement media item 14 to the user device 42. The advertisement service 22 determines that the advertisement definition 20 includes personalized content overlay parameters defining a click-to-call content overlay. The advertising service 22 invokes a call service 52 for generation of a personalized click-to-call content overlay, and sends the call service 52 information related to the subscriber 40 that is used by the call service 52 to generate the personalized click-to-call content overlay.

The call service 52 invokes an offer service 54 to provide the personalized click-to-call content overlay to the user device 42, which in turn renders and combines the personalized click-to-call content overlay with the advertisement media item 14 and presents the combined signal on the display device 44. Assume that the subscriber 40, upon viewing the personalized click-to-call content overlay, decides to activate a trigger that initiates a telephone call to the advertiser 12. The user device 42 receives the input from the subscriber 40 and invokes the call service 52. The call service 52 interacts with a communications server 56 to establish a telephone call between a phone 58 associated with the subscriber 40 and the advertiser 12.

Figure 4:
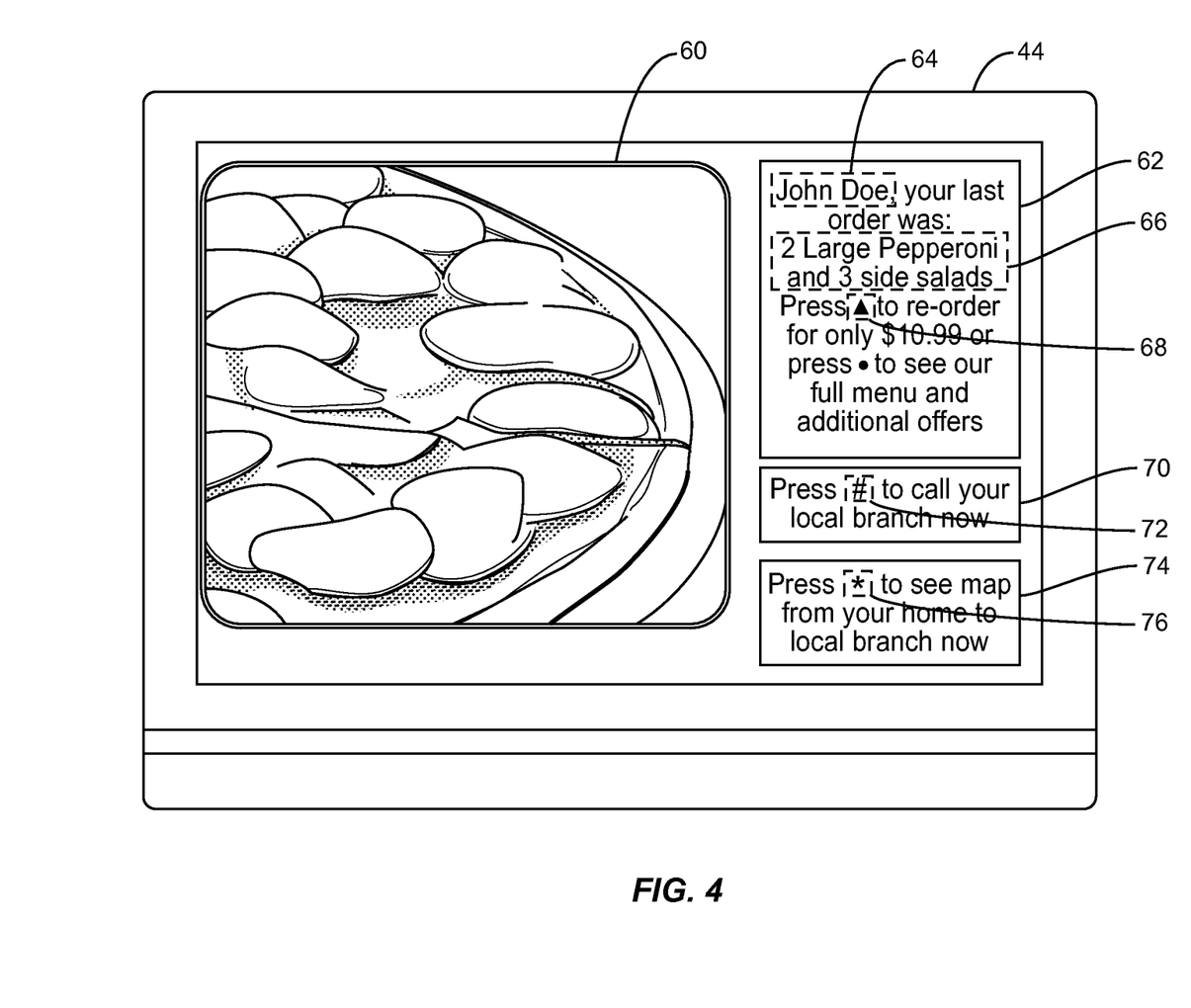
FIG. 4 is an illustration of a personalized content overlay shown on a display device with an advertisement according to one embodiment of the present invention.

FIG. 4 is an illustration of a personalized content overlay shown on the display device 44 with an advertisement 60 according to one embodiment of the present invention. The display device 44 displays the advertisement 60 that is a rendering of the advertisement media item 14. The display device 44 also displays a rendering of a personalized coupon overlay 62, which includes personalization information 64 which, in this example, comprises the name of the subscriber 40 associated with the user device 42 (FIG. 3). The personalized coupon overlay 62 also includes personalization information 66, which refers to the last order the subscriber 40 placed with the advertiser 12. The personalization information 66 may have been provided by the advertiser 12 in response to a request from the advertisement service 22 when the personalized coupon overlay 62 was generated. The personalized coupon overlay 62 can also include a triggerable event 68 which, when activated by the subscriber 40, causes an order to be placed with the advertiser 12. The display device 44 can also display a personalized click-to-call overlay 70 including a triggerable event 72 which, when activated by the subscriber 40, causes a call to be established between the phone 58 (FIG. 3) of the subscriber 40 and the advertiser 12. The display device 44 can also include a personalized map overlay 74, which includes a triggerable event 76 which, when activated by the subscriber 40, causes a map of the nearest franchise location associated with the advertiser 12 to be displayed on the display device 44. The map can be personalized such that the fastest route between the residence of the subscriber 40 and the nearest franchise location of the advertiser 12 is highlighted on the map.

Figure 5A:
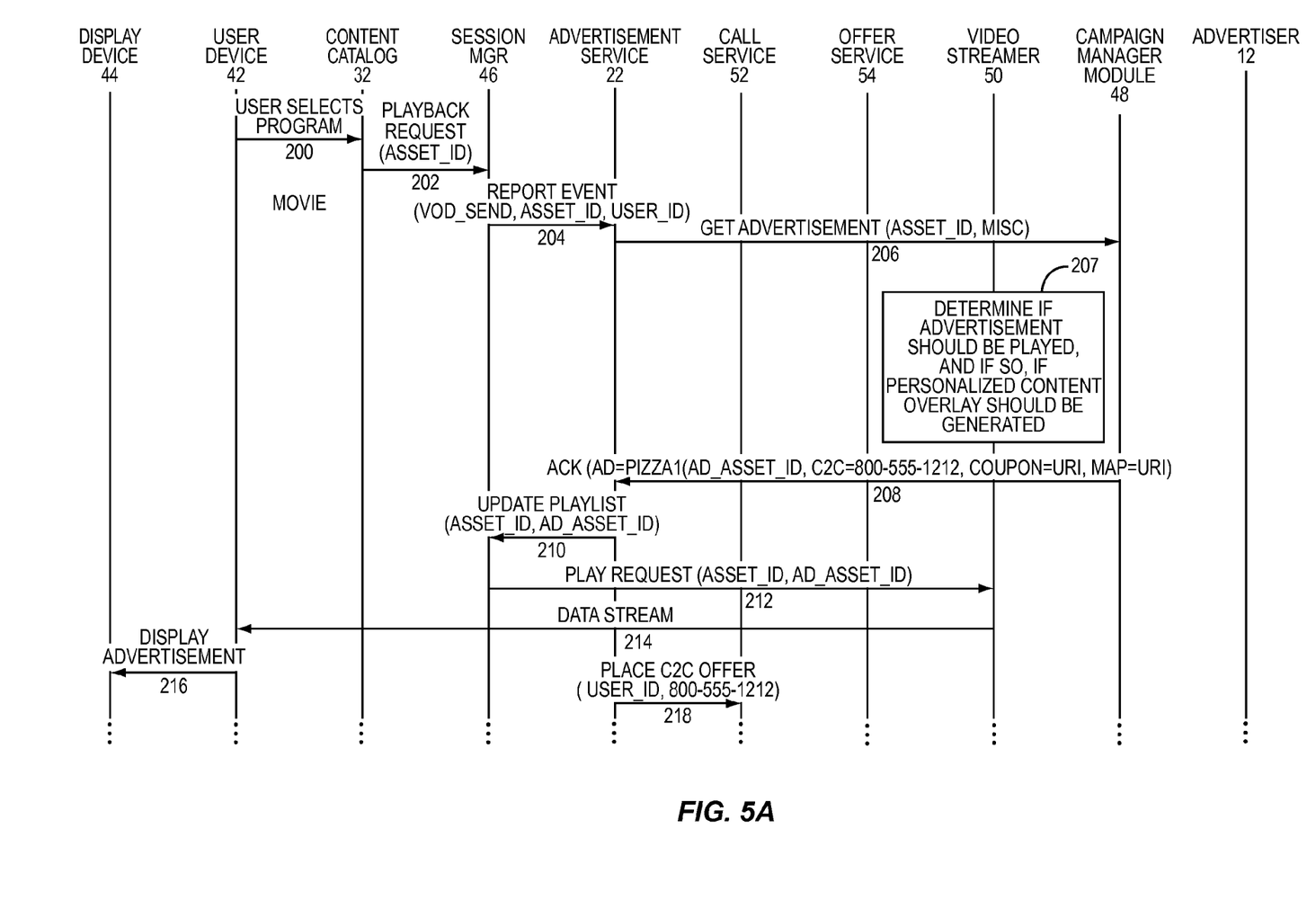
FIGS. 5A and 5B are message flow diagrams showing a message flow and corresponding actions associated with the modules illustrated in FIG. 3 for generating a personalized content overlay.
Figure 5B:
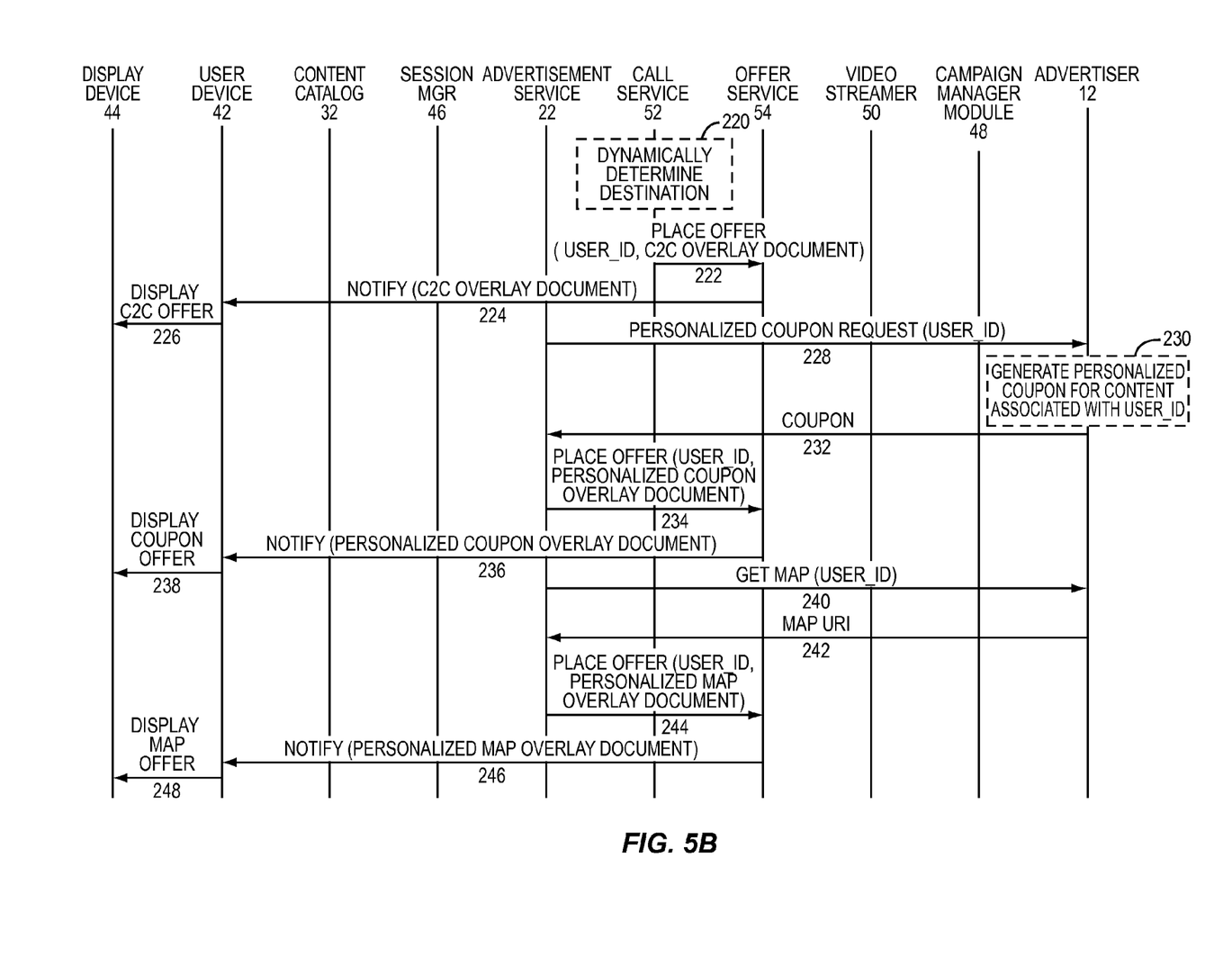

FIGS. 5A and 5B are message flow diagrams showing a message flow and corresponding actions associated with the modules illustrated in FIG. 3 for generating a personalized content overlay. The content catalog 32 receives an identification of a program selected by the subscriber 40 from the user device 42 (step 200). The content catalog 32 sends a Playback Request including a program identifier (ASSET_ID) identifying the program selected by the subscriber 40 to the session manager 46 (step 202). The session manager 46 sends a Report Event including a subscriber identifier (USER_ID) identifying the subscriber 40 associated with the user device 42, the program identifier, and the type of request, which in this example is a video on demand request (VOD_SEND), to the advertisement service 22 (step 204). The advertisement service 22 sends a Get Advertisement request including the program identifier and additional information, such as the subscriber identifier, that may be useful to the campaign manager module 48 (step 206). The campaign manager module 48 reviews the advertisement schedule 24 and determines that an advertisement should be provided to the subscriber 40 prior to displaying the requested program (step 207). The campaign manager module 48 obtains the advertisement definition 20 associated with the advertisement and sends an acknowledgement (ACK) that includes the advertisement definition 20 to the advertisement service 22 (step 208). The advertisement definition 20 includes an identifier identifying a particular advertisement media item 14 (AD_ASSET_ID) and personalized content overlay parameters relating to a click-to-call content overlay, including a telephone number of a franchise location of the advertiser 12 closest to the subscriber 40. The campaign manager module 48 may determine the appropriate telephone number via subscriber information accessed via the subscriber identifier. The advertisement definition 20 also includes a personalized coupon overlay parameter including a URI or other reference, such as an API, to the advertisement service 22. The advertisement definition 20 may also include personalized map overlay parameters including a URI to a personalized map from the subscriber's 40 residence to the closest franchise location of the advertiser 12.

The advertisement service 22 sends an Update Playlist request to the session manager 46 (step 210) that includes the program identifier and the advertisement identifier. The session manager 46 sends a Play Request to the video streamer 50 including the program identifier and the advertisement identifier (step 212). The video streamer 50 initiates a stream of data comprising the advertisement associated with the advertisement identifier to the user device 42 (step 214). The user device 42 renders and displays the advertisement on the display device 44 (step 216). The advertisement service 22 initiates a Place Click-to-Call (C2C) Offer including the subscriber identifier and the telephone number associated with the closest franchise location of the advertiser 12 to the call service 52 (step 218). Alternately, the call service 52 can dynamically determine the appropriate destination, for example, via an application programming interface (API) that maps the subscriber telephone number to a respective branch phone number (step 220). The API may be defined in the advertisement definition 20. The call service 52 generates a click-to-call overlay document defining the personalized C2C content overlay and sends a Place Offer request to the offer service 54 that includes the subscriber identifier and the C2C overlay document (step 222).

The offer service 54 is responsible for communicating personalized content overlay documents to the user device 42 (step 224). The user device 42 can receive the click-to-call personalized content overlay document, render the personalized content overlay, and display the personalized content overlay on the display device 44 (step 226). The advertisement service 22 can also initiate a Personalized Coupon Request including the subscriber identifier to the advertiser server 12 (step 228). The advertiser 12 generates a personalized coupon for the subscriber 40 associated with the subscriber identifier (step 230), and sends the personalized coupon to the advertisement service 22 (step 232). The advertisement service 22 generates a personalized coupon overlay document and sends a Place Offer to the offer service 54 including the subscriber identifier and the personalized coupon overlay document (step 234). The offer service 54 sends a Notify including the personalized coupon overlay document to the user device 42 (step 236). The user device 42 renders the personalized coupon overlay from the personalized coupon overlay document and displays the personalized coupon overlay on the display device 44 (step 238).

The advertisement service 22 can then send a Get Map request to the advertiser 12 (step 240). The advertiser 12 can generate a personalized map using the subscriber information and the residential location of the subscriber 40, indicating on the map a preferred route from the subscriber's 40 residence to the closest franchise location of the advertiser 12. The advertiser 12 may temporarily store the map on a server, and send a URI to the map to the advertisement service 22 (step 242). The advertisement service 22 sends a Place Offer request to the offer service 54, which includes the subscriber identifier and the personalized map overlay document (step 244). The offer service 54 sends a Notify that includes the personalized map overlay document to the user device 42 (step 246). The user device 42 renders and displays the offer for a personalized map on the display device 44 (step 248).

According to one embodiment of the present invention, a personalized content overlay document can include predetermined fields that are used by the appropriate equipment, such as the user device 42, to render the desired personalized content overlay. For example, a "label" field can identify the context of the notification, such as a "call context" that indicates the personalized content overlay is a call notification, an "alert" context that indicates the personalized content overlay is a high priority alert message, an "info" context that indicates the personalized content overlay provides basic information, an "image" context which indicates that the personalized content overlay is a picture, and a "message" context that indicates the personalized content overlay is a message such as a text message or an instant message. The personalized content overlay document can also include a "name" field indicating a name of the originator or sender of the personalized content overlay such as, for example, a name of the advertiser 12; an "address" field indicating an address associated with the personalized content overlay originator, such as a calling number or website URI associated with the advertiser 12; a "subject" field that can be used to identify a brief subject, summary, or introduction for the personalized content overlay; and a "message" field which can include text associated with the personalized content overlay.

The personalized content overlay document can also include an "image" field identifying an image, or a URI pointing to an image, corresponding to a picture that may be associated with the personalized content overlay such as a caller photo, a product photo, or the like. Generally, if an image is included, it is assumed that the presentation of the image is an essential part of the personalized content overlay and should be displayed if the user device 42 has such capabilities. The personalized content overlay document can include a "dispositions" field that identifies the dispositions available to a subscriber 40. Each disposition can include an identifier that identifies a label for the particular disposition. The user device 42 may have a default icon to display for certain identifiers. For example, the user device 42 may display a phone icon for a click-to-call disposition. If the user device 42 has no icon associated with the identifier, the identifier itself can act as a label for the disposition action in the user interface. This would enable new disposition options to be created that need not be known in advance by the user device 42. The disposition field can also include an "action" field, which can identify a URI to invoke upon being triggered by a subscriber 40.

The following table contains an example of a personalized content overlay according to one embodiment of the present invention.

| FIELD | DATA |
| --- | --- |
| Label | Info |
| Name | Mama Bessy Pizza |
| Address | www.mamabessy.com |
| Subject | Personal Coupon For John Doe |
| Message | As a valued customer of Mama Bessy Pizza, John Doe is entitled to receive a large pepperoni pizza at 50% off regular prices. |
| Identifier | Click-To-Call |
| Action | http://cm9520.provider.com/c2c:caller=John Does&callee=mamabessy |
| Identifier | Ignore |
| Action | None |

In the above example, the user device 42 would render a personalized content overlay that contains the text contained in the "Message" field above and provide the subscriber 40 an opportunity to activate one or both of two triggers. The first trigger is a click-to-call trigger, which, if activated, would intiate a phone call with the "Mama Bessy Pizza" company. The second trigger, if activated, would cause a map showing the nearest franchise location of the Mama Bessy Pizza company to be displayed on the user device 42.

Figure 6:
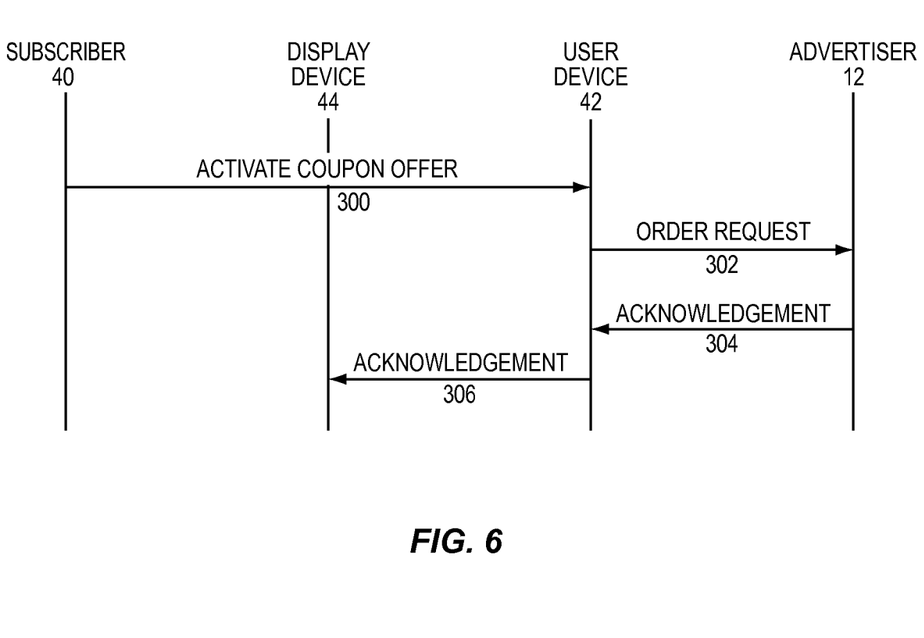
FIG. 6 is a message flow diagram showing a message flow between the modules illustrated in FIG. 3 that may be initiated when a subscriber activates a personalized coupon overlay trigger according to one embodiment of the present invention.

FIG. 6 is a message flow diagram showing a message flow between the modules illustrated in FIG. 3 that may be initiated when the subscriber 40 activates a personalized coupon overlay trigger according to one embodiment of the present invention. The subscriber 40 selects the coupon offer and indicates the selection to the user device 42, typically via a remote control (step 300). The user device 42 initiates an order request to the advertiser 12 (step 302). In turn, the advertiser 12 sends an acknowledgment message to the user device 42 (step 304). The user device 42 renders the acknowledgment for display on the display device 44 (step 306).

Figure 7:
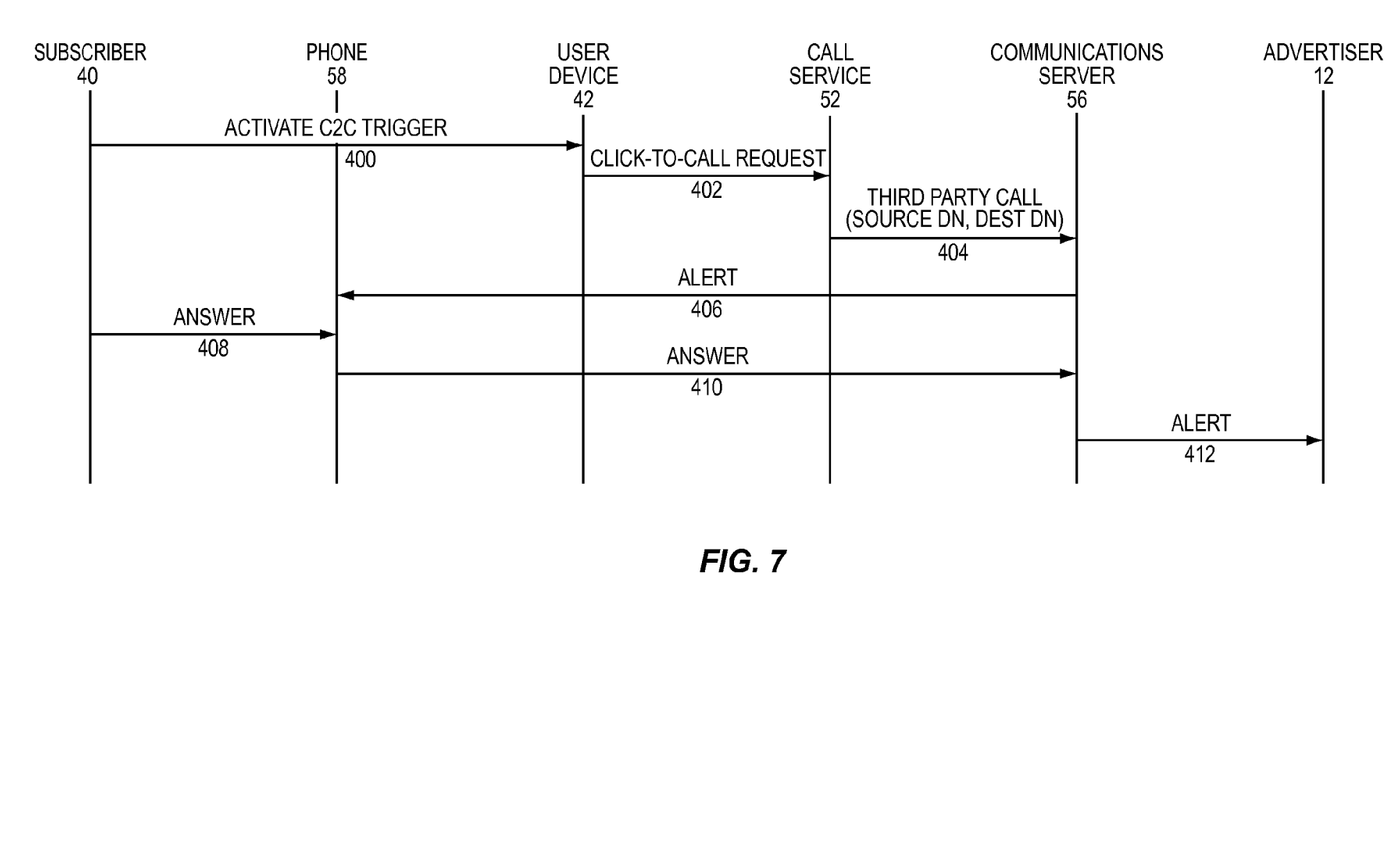
FIG. 7 is a message flow diagram showing a message flow between the modules illustrated in FIG. 3 that may be initiated when a subscriber activates a personalized click-to-call overlay trigger according to one embodiment of the present invention.

FIG. 7 is a message flow diagram showing a message flow between the modules illustrated in FIG. 3 that may be initiated when a subscriber 40 activates a personalized click-to-call overlay trigger according to one embodiment of the present invention. The subscriber 40 activates the click-to-call trigger, typically via a remote control, and communicates the selection to the user device 42 (step 400). The user device 42 sends a Click-to-Call Request to the call service 52 (step 402). The call service 52 sends a Third Party Call request to the communications server 56 and includes in the request a telephone number associated with the phone 58 of the subscriber 40 (SOURCEDN) and the phone number associated with the advertiser 12 (DESTDN) (step 404). The communications server 56 then calls the subscriber's 40 phone 58 (step 406). The subscriber 40 answers the phone 58 (step 408) and the phone 58 indicates to the communication server 56 that the subscriber 40 has answered the phone 58 (step 410). The communications server 56 alerts the advertiser 12 and completes the call between the subscriber 40 and the advertiser 12 (step 412).

Figure 8:
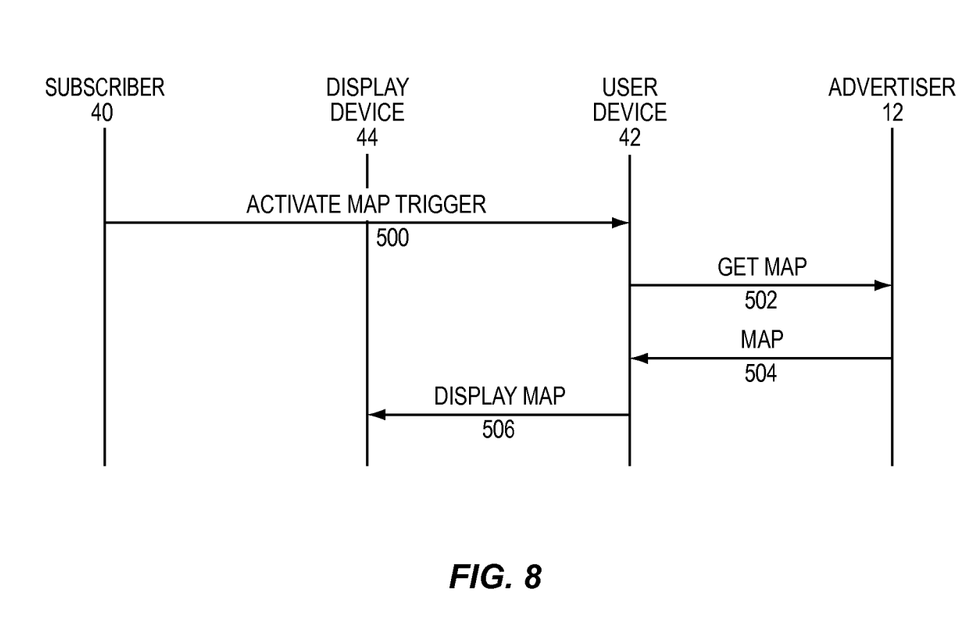
FIG. 8 is a message flow diagram showing a message flow between the modules illustrated in FIG. 3 that may be initiated when a subscriber activates a personalized coupon overlay trigger according to one embodiment of the present invention.

FIG. 8 is a message flow diagram showing a message flow between the modules illustrated in FIG. 3 that may be initiated when the subscriber 40 activates a personalized map overlay trigger according to one embodiment of the present invention. The subscriber 40 activates the personalized map coupon trigger via the user device 42 (step 500). The user device 42 sends a Get Map request to the advertiser 12 (step 502). The advertiser 12 then sends the personalized map to the user device 42 (step 504). The user device 42 renders and displays the personalized map on the display device 44 (step 506).

Figure 9:
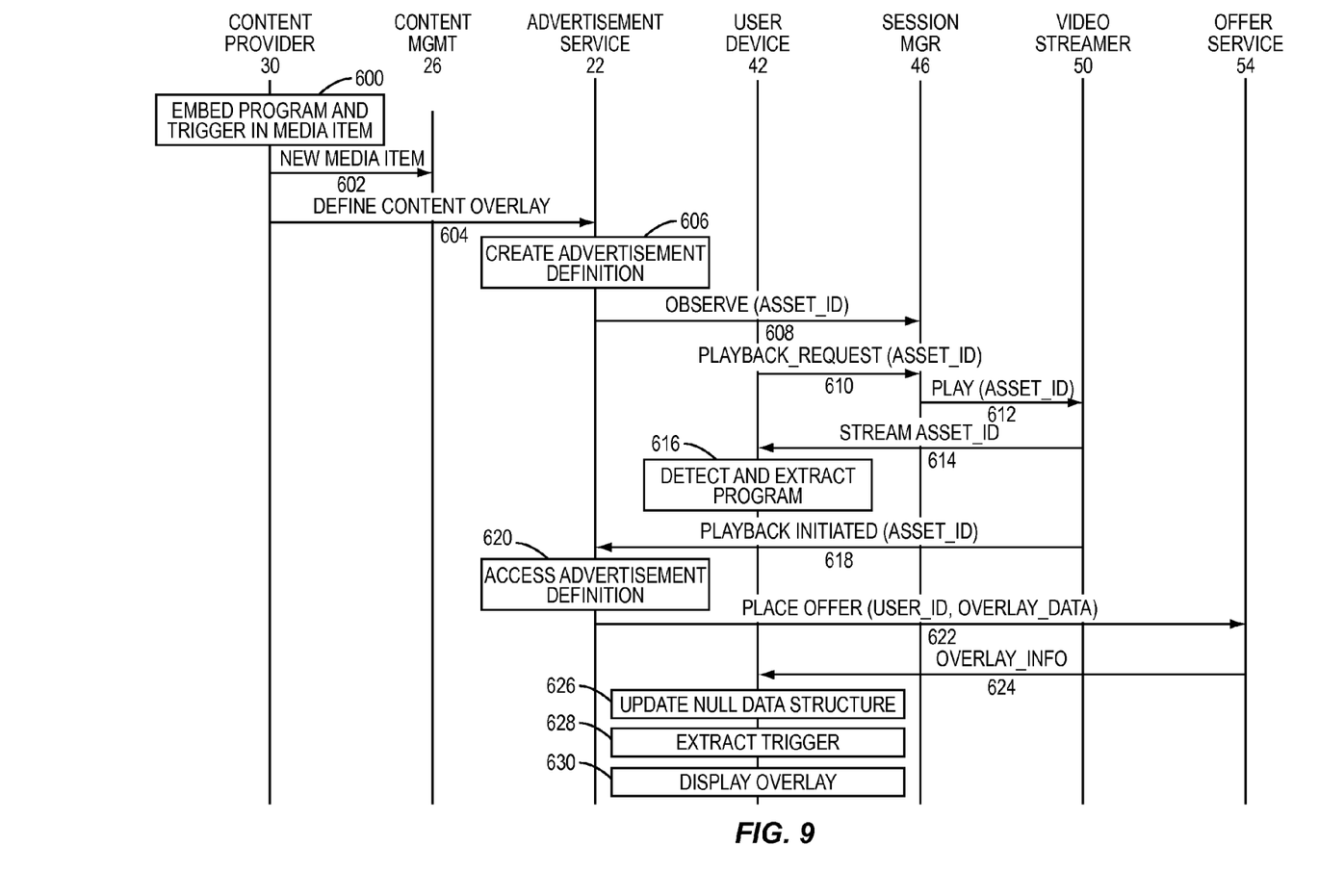
FIG. 9 is a message flow diagram showing a message flow between the modules illustrated in FIG. 3 that may be initiated to provide a personalized content overlay during a product placement scene in a program, according to one embodiment of the present invention.

FIG. 9 is a message flow diagram showing a message flow between the modules illustrated in FIG. 3 that may be initiated to provide a personalized content overlay during a product placement scene in a program, according to one embodiment of the present invention. The media item may be a movie, such as the movie "Batman," that includes a product placement. For example, a scene in the movie may show one character using a cell phone to contact another character, and the manufacturer of the cell phone may be prominently displayed during the scene. The content provider 30 embeds a data program, for example a software program implemented in Java code, in a data block embedded in an MPEG transport stream of a media item (step 600). The data program embedded in the transport stream is designed to pull personalized content overlay data from a predefined structure. The structure initially contains NULL data. Mechanisms for embedding Java code programs into digitally encoded media are known to those skilled in the art and will not be discussed in detail herein. The content provider 30 also embeds one or more triggers into the MPEG transport stream associated with one or more product placement scenes at the location in the stream where the content provider 30 desires to have a personalized content overlay played. The triggers point to the embedded data program as described above.

The content provider 30 provides the media item to the content management module 26 (step 602). The content provider 30 also provides the personalized content overlay information to the advertisement service 22 (step 604). The advertisement service 22 generates an advertisement definition for the media item (step 606). The advertisement service 22 initiates an 'observe' request including the ASSET_ID of the media item to the session manager 46 (step 608). An 'observe' request indicates to the session manager 46 that the session manager 46 should apprise the advertisement service 22 when a request is made by a subscriber to play that particular media item. For purposes of illustration, message acknowledgements between the various modules shown in FIG. 9 are not represented herein; however, it will be apparent to those skilled in the art that each message described herein may be followed by a message acknowledgement from the receiving device to the sending device.

The session manager 46 receives a playback request for that respective ASSET_ID from a user device 42 (step 610). The session manager 46 initiates a play request including the ASSET_ID to the video streamer 50 (step 612). The video streamer 50 initiates a stream of the ASSET_ID to the user device 42 (step 614). The user device 42 detects and extracts the data program that was embedded into the media item by the content provider 30 (step 616). The video streamer 50 also notifies the advertisement service 22 that a user device 42 has requested the ASSET_ID (step 618). The advertisement service 22 accesses the advertisement definition associated with that ASSET_ID (step 620). The advertisement service 22 initiates a 'place offer' request with the offer service 54 in accordance with the personalized content overlay parameters (step 622). The offer service 54 generates the requested offer and sends information defining the personalized content overlay to the user device 42 (step 624). The user device 42 updates the NULL data structure that was created by the content provider 30 in step 600 with the personalized content overlay information (step 626). At the appropriate point in the transport stream, the user device 42 extracts the embedded trigger (step 626), and presents for display to the user the personalized content overlay (step 630).

For purposes of illustration and clarity, the functionality described herein has been shown as being incorporated in certain modules. However, it should be apparent to those skilled in the art that the functionality associated with the various modules as described herein could be integrated or separated into any number of modules as desired, or appropriate, without departing from the present invention.

Figure 10:
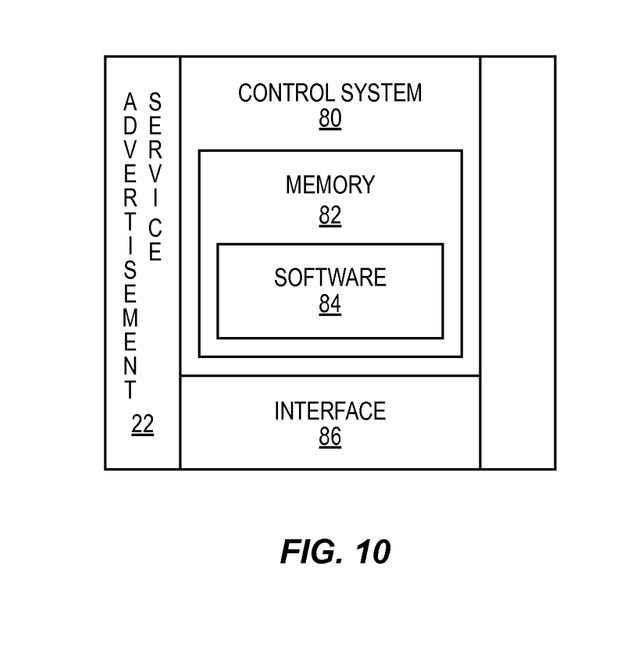
FIG. 10 is a block diagram illustrating an advertisement service according to one embodiment of the present invention.

FIG. 10 is a block diagram illustrating the advertisement service 22 according to one embodiment of the present invention. The advertisement service 22 can comprise a control system 80 that includes a memory 82 including software 84 suitable for carrying out the functionality as described herein. The advertisement service 22 can also include an interface 86 for communicating either via a data communications network, an inter-process communication, or otherwise as appropriate to communicate with the other modules described herein.

Figure 11:
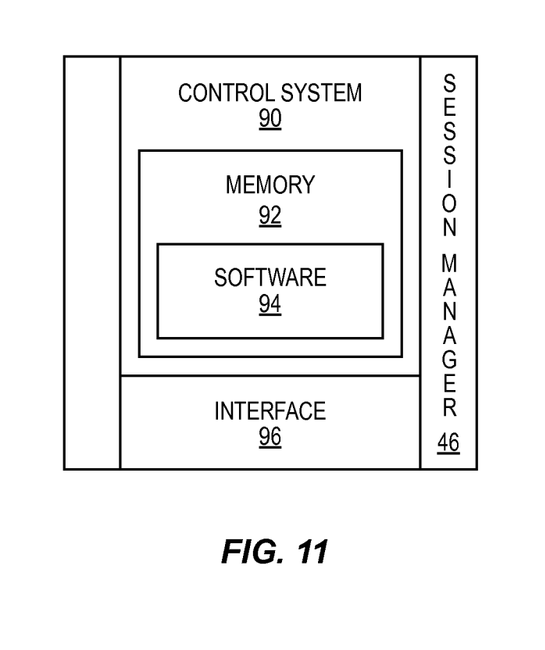
FIG. 11 is a block diagram illustrating a session manager according to one embodiment of the present invention.

FIG. 11 is a block diagram illustrating the session manager 46 according to one embodiment of the present invention. The session manager 46 can include a control system 90 having a memory 92 into which software 94 resides suitable for carrying out the functionality described herein. The session manager 46 can also include an interface 96 suitable for communicating over a network or via inter-process communication with the other modules described herein.

Those skilled in the art will recognize improvements and modifications to the preferred embodiments of the present invention. All such improvements and modifications are considered within the scope of the concepts disclosed herein and the claims that follow.

What is claimed is:

1. A method for providing personalized content overlays, the method comprising:

providing a campaign manager module for implementing an advertisement campaign for each of a plurality of advertisers;

generating and storing, at the campaign manager module, advertisement definitions including content overlay parameters specifying types of overlays and a link identifying one or more prerecorded advertisement media items for each of the advertisers, wherein the types of overlays comprise a click-to-call overlay, a coupon overlay, and a map overlay;

retaining, at the campaign manager module, an advertisement schedule for coordinating receipt and storage of the one or more prerecorded advertisement media items via the link;

accessing, at the campaign manager module, subscriber specific data using a subscriber identifier;

generating personalized content overlays by overlaying the overlays specified by advertisement definitions with the subscriber specific data; and effecting presentation of the personalized content overlays as overlays to the prerecorded advertisement media items being provided to subscribers using the advertisement definitions, wherein the personalized content overlays correspond to the types of overlays specified in the advertisement definitions, and wherein the presentation is effected according to the advertisement schedule retained at the campaign manager module.

2. The method of claim 1 further comprising receiving a media item request of a subscriber, and wherein generating one of the personalized content overlays is in response to the media item request, and wherein a media item delivered to the subscriber is a media item associated with the media item request of the subscriber.

3. The method of claim 1 further comprising receiving a media item request of a subscriber, and wherein generating one of the personalized content overlays is in response to the media item request, and wherein a media item delivered to the subscriber is a different media item than a media item associated with the media item request of the subscriber.

4. The method of claim 3 wherein the delivered media item is an advertisement.

5. The method of claim 4 further comprising determining that the advertisement media items should be provided to the subscribers in accordance with the advertising schedule.

6. The method of claim 1 further comprising receiving an on-demand request of a subscriber, and wherein generating one of the personalized content overlays is in response to the on-demand request, and a media item delivered to the subscriber comprises a program requested by the on-demand request.

7. The method of claim 6 wherein the generated personalized content overlay corresponds to content in the program and is presented in association with the content being provided to the subscriber.

8. The method of claim 7 wherein the generated personalized content overlay is presented in association with the content being provided to the subscriber based on data embedded in the program.

9. The method of claim 1 wherein effecting presentation of the personalized content overlays as the overlays to the advertisement media items being provided to the subscribers comprises directing a user device to present a personalized content overlay as the overlay to an advertisement media item being provided to a subscriber.

10. The method of claim 1 wherein effecting presentation of the personalized content overlays as the overlays to the advertisement media items being provided to the subscribers comprises displaying a personalized content overlay as the overlay to the advertisement media item being provided to a subscriber on a display device.

11. The method of claim 1 further comprising receiving a media item request from a set top box, and wherein generating one of the personalized content overlays is in response to the media item request.

12. The method of claim 1 further comprising receiving a media item request of a subscriber, and wherein generating one of the personalized content overlays is in response to the media item request, and wherein the media item request of the subscriber is received from the subscriber.

13. The method of claim 1 wherein one of the content overlay parameters comprises a click-to-call.

14. The method of claim 1 wherein the information associated with the subscribers comprises information derived from user profiles associated with the subscribers.

15. A device for providing personalized content overlays, the device comprising:

an interface to communicate with a network; and a control system including:

a campaign manager module for implementing, generating, and storing with the campaign manager module advertisement definitions containing content overlay parameters specifying types of overlays and a link identifying one or more prerecorded advertisement media items for each of the advertisers, wherein the types of overlays comprise a click-to-call overlay, a coupon overlay, and a map overlay, and wherein the campaign manager module is configured to retain an advertisement schedule for coordinating receipt and storage of the one or more prerecorded advertisement media items via the link, and wherein the campaign manager module is configured to access subscriber specific data using a subscriber identifier;

the control system generating personalized content overlays by overlaying the overlays specified by the advertisement definitions with the subscriber specific data; and effecting presentation of the personalized content overlays as overlays to the prerecorded advertisement media items being provided to the subscribers using the advertisement definitions, wherein the personalized content overlays correspond to the types of overlay specified in the advertisement definitions, and wherein the presentation is effected according to the advertisement schedule retained at the campaign manager module.

16. The device of claim 15 wherein the control system is further to receive a media item request of a subscriber, and wherein one of the personalized content overlays is generated in response to the media item request, and wherein a media item delivered to the subscriber is associated with the media item request of the subscriber.

17. The device of claim 15 wherein the control system is further to receive a media item request of a subscriber, and wherein one of the personalized content overlays is generated in response to the media item request, and wherein a media item delivered to the subscriber is different than a media item associated with the media item request of the subscriber.

18. The device of claim 15 wherein the control system is further to receive an on-demand request of a subscriber, and wherein one of the personalized content overlays is generated in response to the on-demand request, and a media item delivered to the subscriber comprises a program requested by the on-demand request.

\* \* \* \* \*